Figure 1:
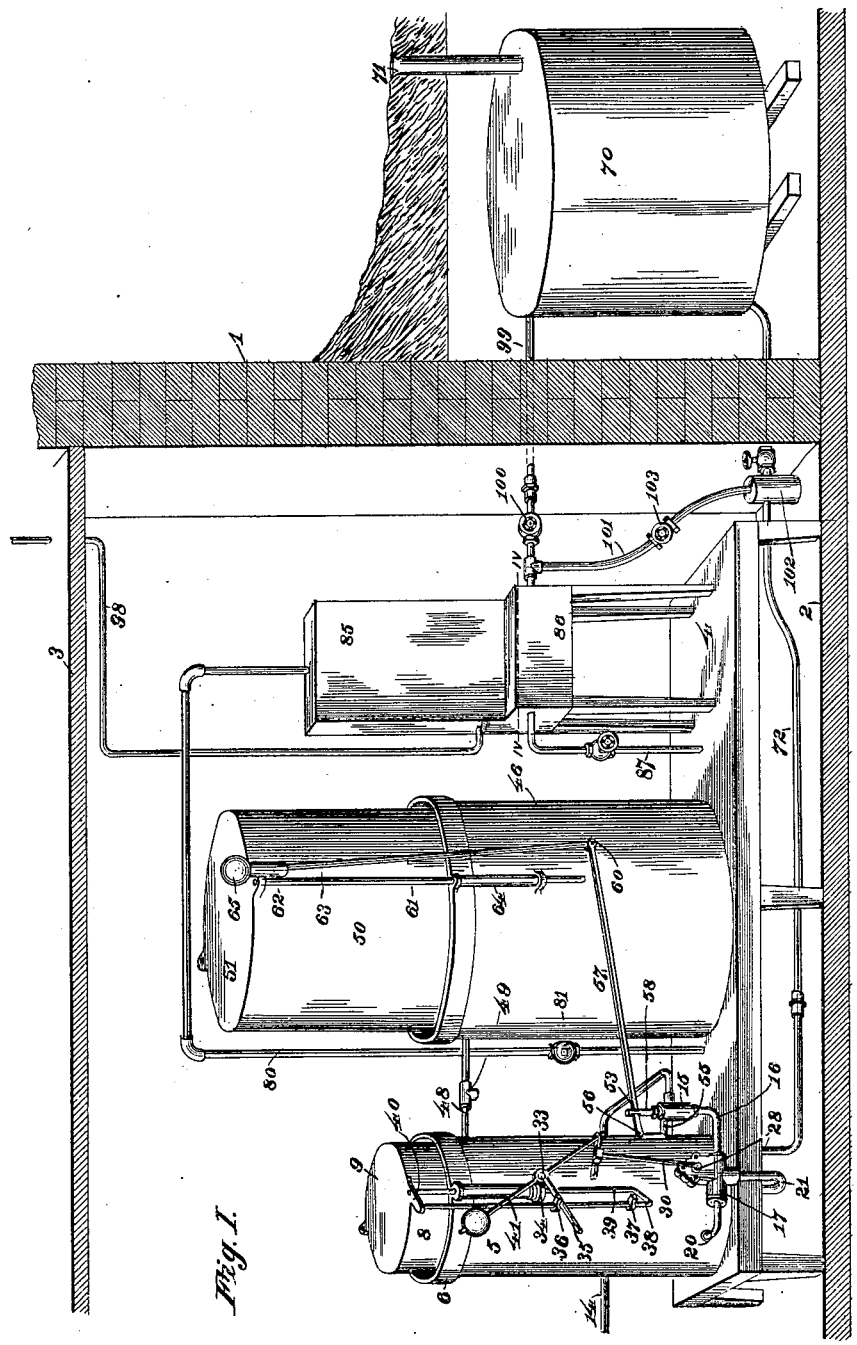

No. 678,973. Patented July 23, 1901.
S. C. NORTH.
PROCESS OF MAKING CARBURETED AIR.
(Application filed Sept. 8, 1900.)
(No Model.) 3 Sheets—Sheet 1.

Witnesses

Inventor:
Stanley C. North,
By Joseph T. Atkins
Attorney

No. 678,973. Patented July 23, 1901.
S. C. NORTH.
PROCESS OF MAKING CARBURETED AIR.
(Application filed Sept. 8, 1900.)
(No Model.) 3 Sheets—Sheet 2.
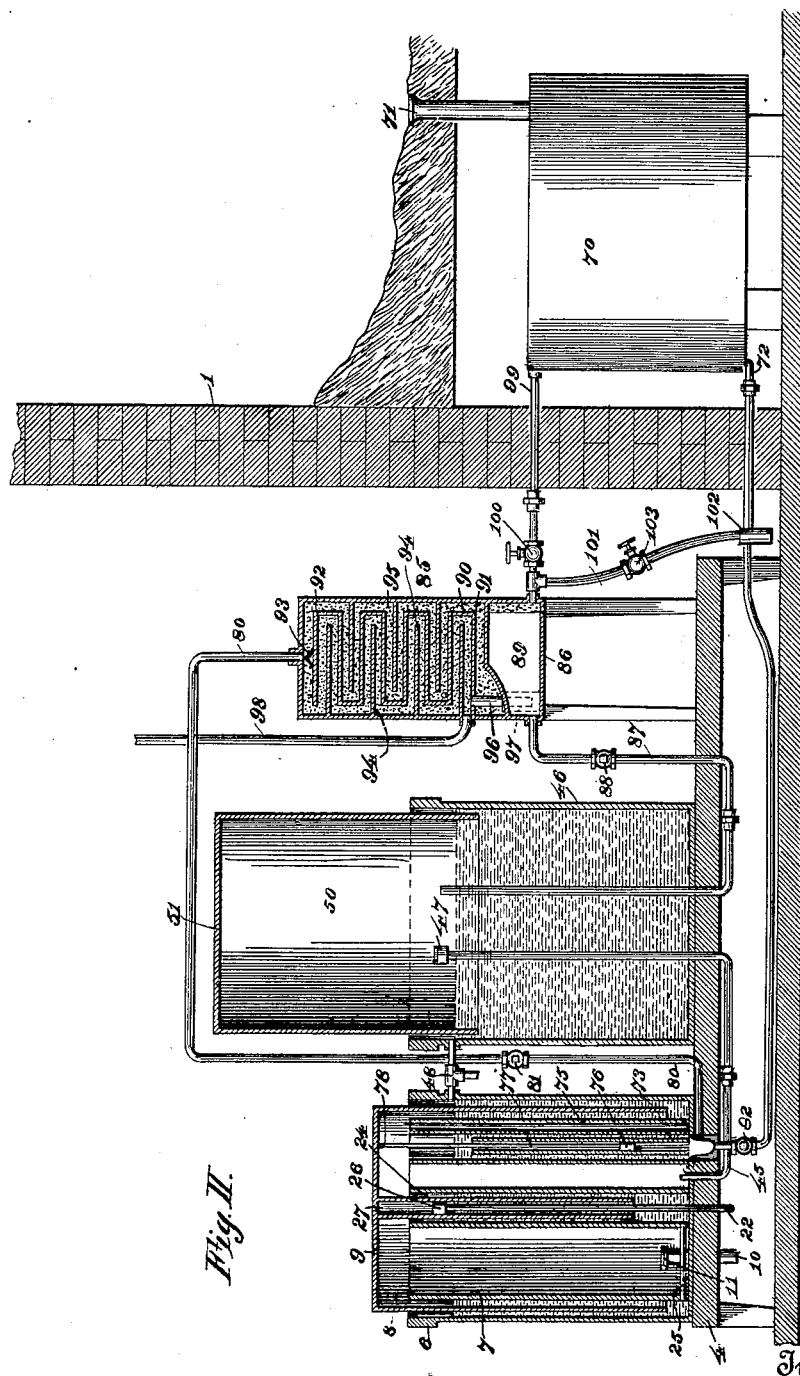
Fig. II.
Witnesses
Inventor:
Stanley C. North,
By Joseph L. Atkins
Attorney.

No. 678,973. Patented July 23, 1901.
S. C. NORTH.
PROCESS OF MAKING CARBURETED AIR.
(Application filed Sept. 8, 1900.)
(No Model.) 3 Sheets—Sheet 3.
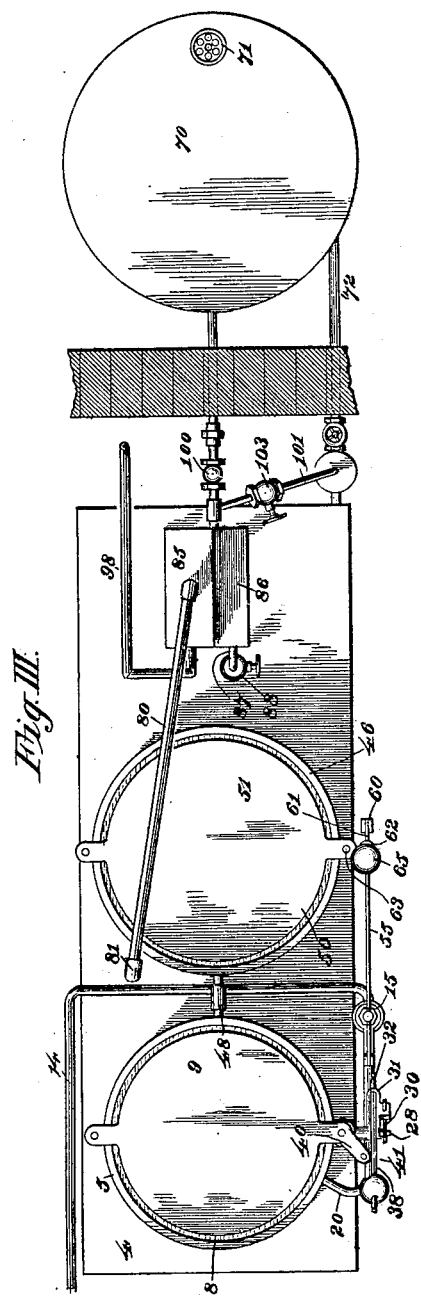
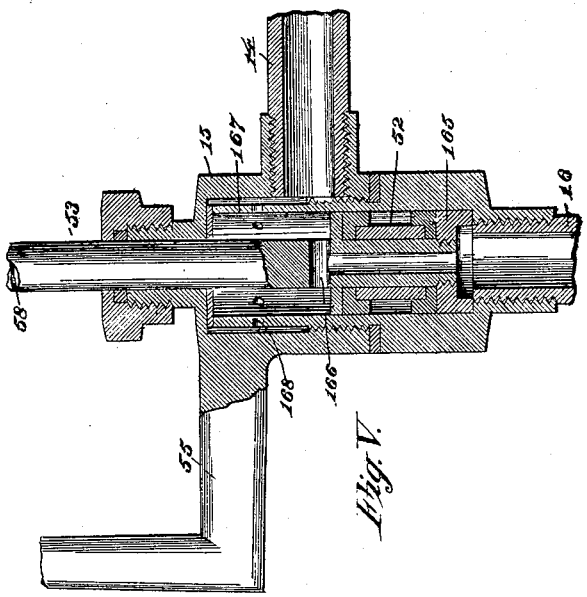
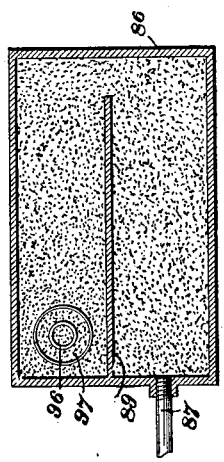
Witnesses
Inventor:
Stanley C. North,
By Jasper L. Atkins
Attorney.

UNITED STATES PATENT OFFICE.

STANLEY C. NORTH, OF CANANDAIGUA, NEW YORK.

PROCESS OF MAKING CARBURETED AIR.

SPECIFICATION forming part of Letters Patent No. 678,973, dated July 23, 1901.

Application filed September 8, 1900. Serial No. 29,405. (No specimens.)

*To all whom it may concern:*

Be it known that I, STANLEY C. NORTH, of Canandaigua, in the county of Ontario, State of New York, have invented certain new and useful Improvements in Gas Manufacture, of which the following is a complete specification, reference being had to the accompanying drawings.

My invention relates to improvements in the manufacture of combustible gas, particularly carbureted air, and comprehends improvements in the method of manufacture whereby gas of substantially uniform quality of richness may be produced and whereby all watery vapors are condensed out of or expelled from the gas.

In the manufacture of carbureted air the variability of its quality and the presence of watery vapor are serious practical objections which by the present invention are for all practical purposes entirely eliminated.

In the accompanying drawings in order to clearly define my present invention I illustrate one form of embodiment of apparatus by which the same may be practiced.

The apparatus is not essential to the practice of my present invention, which may be practiced by a variety of means, and the apparatus is not claimed herein, but is made the subject-matter of my applications for United States Letters Patent, Serial Nos. 682,197 and 718,403, filed, respectively, May 31, 1898, and May 26, 1899.

In the accompanying drawings, Figure I is a perspective view of the apparatus above referred to complete. Fig. II is a vertical section, partially in elevation, of the same. Fig. III is a top plan view of the subject-matter of Fig. I. Fig. IV is a detail sectional view on the line IV IV of Fig. I. Fig. V is a longitudinal sectional view, on an enlarged scale, of the water-supply cut-off valve shown in Fig. I.

Although the entire apparatus shown in the drawings and hereinafter described in detail is not essential to the practice of my invention, yet it is believed that a knowledge thereof will contribute to a perfect comprehension of my present invention, and for that reason it is shown and described.

Referring accordingly to the numerals on the drawings, 1 represents, by way of illustration, the wall of a building within which my apparatus is located, 2 the cellar-floor thereof, and 3 the first floor.

4 indicates a low table or platform adapted to support the several members constituting my apparatus. Arranged in preferred order upon the platform 4 I provide a primary receiver 5, that constitutes, essentially, an air-pump. In the form illustrated it consists of a pair of double concentric cylinders 6 and 7, divided by an intermediate water-space into which an inverted cylinder or dome 8, having a closed top 9, is telescoped. The intermediate space between the cylinders 6 and 7 is in operation kept supplied with water, so that the dome 8, through reciprocatory movement within the space provided for it, is adapted to perform the function of an air-pump. For the admission of air an air-supply port 10, closed by an inwardly-opening check-valve 11, is provided.

In order to produce the reciprocatory movement of the dome above referred to, I employ suitable actuating mechanism, which consists in the preferred form of embodiment illustrated of a hydraulic motor.

14 indicates a water-supply pipe communicating with a source of water-supply (not illustrated) and adapted to afford a supply of water at required pressure.

In practice the source of water-supply may be the usual street-main of a city water system. The pipe 14 communicates through the shell 15 of cut-off-valve mechanism through an intermediate pipe connection 16 with the shell 17 of a controlling-valve. This valve is connected, as by a pipe 20, with the interior of the cylinder 6 and by a pipe 21 with a pipe 22, located (see Fig. II) concentrically within the cylinders 6 and 7, from which it is divided by a cylinder 24, connected to and rising from the common base of the cylinders 6 and 7. The interior of the cylinder 24 and the space between the cylinders 6 and 7 may be connected, as by a pipe 25. The pipe 22 constitutes in effect a hollow piston-rod, being provided at the upper extremity (see Fig. II) with a piston 26, that works in a barrel 27, secured to the inner side of the head 9 of the dome 8. If now water be alternately admitted and discharged through the pipe 22, provision will be made for the reciprocatory movement of the dome 8, through which the pumping action of the primary receiver 5 is obtainable. To accomplish that object, I provide within the shell 17 a suitable valve, by means of which, it is sufficient to specify in this connection, a rock-shaft 28 by movement in one direction is adapted to place the pipes 16 and 21 in communication, and thereby to impart an upward impulse to the dome 8, or by movement in the opposite direction to place the pipes 20 and 21 in communication, whereby water previously supplied through the pipe 22 to the barrel 27 is exhausted from the barrel to allow it to flow into the space between the cylinders 6 and 7 and thence to waste, in a manner to be presently pointed out.

To accomplish the rocking movement of the shaft 28, I provide an arm 30, that carries upon its upper end an elongated loop 31, within which works one end 32 of a bell-crank trip-lever, pivoted, as indicated at 33, to the outside of the cylinder 6, preferably upon a sleeve 34 thereon. The arm 35 of the bell-crank trip-lever extends between projections 36 and 37, adjustably secured upon a rod 38, which is preferably one leg of a U-shaped guide-rod, the other leg 39 of which works within the sleeve 34 and which being secured to the dome 8, as by means of a lug 40, serves to guide the dome in its vertical reciprocation. Two diametrically opposite guide-rods are provided upon the primary receiver 5, but only one is adapted to carry the projections 36 and 37 and to actuate the trip-lever. For this reason only one is shown in detail in the drawings. The projections 36 and 37 are made adjustable, so that the extent of the reciprocal movement of the dome 8 may be regulated at will. On the opposite side of the pivot 33 and constituting an extension of the arm 32 I provide counterweight-arm 41.

By means of the mechanism last described when the stop-piece 36 is by the upward movement of the dome 8 lifted so as to come into contact with the arm 35 of the trip-lever it lifts that arm until the counterweight-arm 41 passes the center, when it will cause the arm 32 to strike one end of the loop 31 and through the arm 30 actuate the rock-shaft 28, thereby shutting off communication between the pipes 16 and 21 and establishing drainage communication between the pipe 21 and the pipe 20. During the descent of the dome 8, in consequence of its weight and the drainage of the water from the barrel 27, with which the pipe 21 communicates, the projection 36 upon the rod 38 approaches and finally makes contact with the arm 35 of the bell-crank trip-lever. By this engagement the trip-lever is swung in a direction opposite from that last described until the counterweight-arm 41 causes the arm 32 to strike the end of the loop 31 opposite to that last referred to, and actuating the rock-shaft 28 shifts the controlling-valve, so as to establish communication between the pipes 16 and 21. Thereupon the drum 8 begins to rise and the operation previously described is repeated.

As was above suggested in the foregoing description, the rise of the dome 8 causes an inspiration through the port 10, and it is necessary to assume that means of egress for the air from the dome 8 is provided in order to permit its descent, the port 10 being provided with a check-valve, preventing egress of air at that point. Such means consists of a pipe 45, that extends from the bottom of the cylinder 7 into the interior of the cylinder 46 of a secondary receiver or aerometer communicating and coöperating with the primary receiver 5. The pipe 45 rises within the cylinder 46, above the water-level therein, and terminates in a check-valve 47. Water may be supplied to the cylinder 46, as well as to the space between the cylinders 6 and 7, through the exhaust-pipe 20, previously described. For that purpose a pipe 48 may unite the cylinders 6 and 46 at a required level and communicating with a waste-pipe 49, that may lead to a sewer or some other drain, affords means of preserving a constant and uniform level within the cylinders 6 and 46.

Within the cylinder 46 telescopes an inverted cylinder 50, which, being provided with an air-tight head 51, constitutes a dome. Inasmuch as the pipe 45 discharges into the cylinder 50 each downward movement of the dome 8 will tend to raise the cylinder 50. It is manifest, therefore, that without provision to the contrary the continued operation of the dome 8 must be in exact proportion to the consumption of air from the cylinder 50 or waste of air will be produced from that cylinder. Accordingly I provide within the shell 15 a cut-off valve 52, operatively connected, as through its valve-stem 53, with the cylinder 50 in such a manner as to cause the valve 52 to shut off the water-supply when the cylinder 50 is full of air and to open it only when it is empty or sufficiently so to require renewed supply of air. With that end in view I have provided a bracket-arm 55 upon the shell 15, that pivotally supports, as indicated at 56, the short arm of a lever 57, which, working through a slot 58 in the valve-stem 53, is adapted by its upward-and-downward movement alternately to close and open the valve 52. The lever 57 is pivoted, as indicated at 60, to the end of a rod 61, loosely movable within a sleeve 62, secured to the cylinder 50, preferably in proximity to the place of junction with the cylinder of one of the guide-rods 63, that work in sleeves 64 upon opposite sides of the cylinder 46. The upper end of the rod 61 is provided with a weight 65, which is sufficiently ponderous to keep the valve 52 normally open, but which is located upon the rod 61 at such a distance from the pivot 60 as to engage with the sleeve 62 when the cylinder 50 rises the required height, and so insure the closing of the valve 52 at that time. The valve 52 is preferably a piston-closing valve and tends automatically to close against the counter action of the weight 65; but I prefer to provide the additional means of closing the valve, so that the closing of the valve is made positively dependent upon the movement of the cylinder 50, with respect to whose movement the closing of the valve becomes necessary, as above set forth.

In the foregoing specification I have described, solely by way of illustration in the present connection, an automatic device for producing an uninterrupted supply of air at a constant pressure.

Coming now to that feature of my invention which relates more essentially to the subject-matter of this application, 70 indicates a source of oil supply or tank adapted to contain a volatile hydrocarbon oil—for example, naphtha or gasolene. It is preferably buried in the ground and completely separated from the carbureting apparatus, as by a wall 1. The tank 70 constitutes a source of supply of hydrocarbon oil that is desired to be volatilized and combined with the air supplied by the mechanism already described or by other suitable apparatus in such manner as to produce a practicable and efficient illuminating-gas.

The tank 70 being provided with a vent 71, which may serve both as a means of filling the tank from above ground, as well as for preventing the formation of a vacuum within the tank, I connect it, as by a pipe 72, with the barrel 73 of an oil-pump, preferably located within the cylinder 7, from which it is isolated, as by a cylinder 75. Within the barrel 73 reciprocates a piston 76, whose rod 77 is secured, as indicated at 78, to the head 9 of the dome 8. The barrel 73 communicates with the pipe 80 and that pipe, as well as the pipe 72, being provided, respectively, with check-valves 81 and 82, the reciprocation of the piston 76 within the barrel 73, through the rise and fall of the dome 8, serves to draw a supply of oil from the tank 70 and to force it through the pipe 80. The pipe 80 conducts the oil to the condensing and scrubbing chamber 85 of my carbureter, of which 86 may be designated as the "generator."

The generator consists, essentially, of a closed chamber or receptacle in which the air is saturated with the vapors of the volatile hydrocarbon. For that purpose it communicates with a pipe 87, that extends upwardly from the bottom of the cylinder 46 to a point above its water-level. It is also preferably provided with a cock 88, by which communication between the generator and the secondary receiver may be, if desired, cut off. The generator is filled, as usual, with an absorbent material—for, example, wicking—which, taking up by capillarity the hydrocarbon supplied to it and exposing it in thin films, impregnates the air forced through the mass of absorbent material with the vapor of the oil. In order to economize space, I provide a longitudinal vertical partition 89 within the generator that extends from the end of the generator, near its connection with the pipe 87, to a line approximate to but separated from the opposite end wall of the generator. By this means the capacity of the generator in proportion to the space it occupies is practically doubled, air passing from the pipe 87 being compelled to force its way around the end of the partition 89 in order to gain access to the interior of the scrubbing and condensing chamber 85, which communicates with the generator and preferably surmounts the same.

The interior of the scrubbing and condensing chamber 85 is separated into two parts by what may be termed a "looped partition-plate" 90, extending from a plane 91 a little above the bottom of the chamber 85 to a plane 92 immediately underneath the discharge end of the pipe 80, a deflector 93 being preferably employed opposite the discharge end of the pipe 80 in order to divide the flow of oil issuing therefrom. Within each loop of the partition 90 I provide a baffling plate or shelf 94, extending alternately from opposite end walls of the chamber 85. The space between the partition 90 and the several baffling-plates is in practice filled with a suitable absorbent material 95—as, for example, cotton fabric. From the bottom of the plate 91 a pipe 96 extends into a well 97 within the generator 86. It is adapted to carry off the superfluous oil as it accumulates above the plate 91.

In operation the oil within the well 97 forms, with the pipe 96, a liquid seal, which prevents passage of air from the generator upward through the pipe 96.

98 indicates a service-pipe leading to the points of consumption. (Not illustrated.)

99 indicates a pipe leading from the generator, near its bottom, to the tank 70 and provided, preferably, with a cock 100, by which that means of communication is controlled.

101 indicates a branch pipe leading from the pipe 99 to an equalizer 102 in the pipe 72, a cock 103 being provided for controlling the flow through the pipe 101.

In the foregoing specification reference was made from time to time to the mode of operation of the several parts, but the following may be added by way of brief description of the operation of the apparatus as a whole.

Let it be assumed that air under pressure from the pipe 87 is at all times seeking passage through the generator 86 and the scrubber and condenser 85 to the pipe 98. If there is no consumption from the pipe 98, the machine will be at rest. Assuming, therefore, that there is a flow of gas drawn from the pipe 98, the operation is as follows: Water under pressure enters the pipe 14, cut-off valve-shells 15, pipe 16, controlling valve-shell 17, and pipes 20 and 21 alternately. This flow of water, in the manner previously described, serves to produce a supply of air through the pipe 45 to the interior of the cylinder 50. If that cylinder becomes filled, it operates the lever 57, in the manner previously described, to close the shut-off valve 52 and interrupt for the time being the supply of air from the primary receiver 5. As soon as the cylinder 50 descends the flow of water through the pipe 14 recommences. Consequently the cylinder 50 is kept at all times provided with an ample supply of air which, under pressure derivable from the weight of the cylinder 50, is forced through the pipe 87 into the generator 86. There the air becomes saturated with the vapors of the volatile oil, with which the absorbent material in the generator is kept, in the manner to be presently described, supplied. Passing around the partition 89 within the generator the combined air and gaseous vapor ascends around the partition 90 and through the packing 95 across the upper plate 92 of the partition 90 and down upon the opposite side of that partition and issues in condition ready for use through the pipe 98. The absorbent material in the chamber 85 and in the generator 86 is kept supplied with oil drawn through the pipe 72 and forced by the piston 76 through the pipe 80. Discharged from the pipe 80 against the deflector 93 a portion of the oil passes upon one side of the partition 90 and the remainder upon the other side of the partition. The superfluous oil on the one side of the partition descends into the generator through the pipe 96 and the other portion descends into it directly from the chamber 85.

By the employment of the apparatus above described a constant flow of oil through the chamber 85 is provided. A part of the flow of oil proceeds downwardly against the incoming current of air and vapor of gas and the other proceeds to the bottom of the chamber 85 in the same direction with the gas. The result is the production of an improved quality of carbureted air or gas. As the oil accumulates in the bottom of the generator 86, provision must be made for its discharge. Accordingly it may be conducted through the pipe 99 back to the tank 70. It is well known in the art, however, that the carburet produced from unused gasolene is richer than that which has been partly volatilized. Consequently it happens that the quality of gas produced by carbureting apparatus generally is not uniform in quality, the gas being richer at one time than at another. For that reason instead of conducting the superfluous oil from the generator 86 directly to the tank 70 I prefer to conduct it to the receptacle 102, where, commingling with an influx of fresh gasolene from the tank 70, it produces a uniform quality of oil, consisting of the mixture of fresh and spent oil. This mixture continues practically uniform in quality so long as any oil remains in the tank 70. In consequence of its function of equalizing the quality of the fresh and spent oil I denominate the receptacle 102 an "equalizer."

The cocks 100 and 103 afford means for draining the generator directly into the tank 70 or into the equalizer 102, as preferred. It is with respect to the supply of oil in the manner above described to the scrubber and condenser 85 that my improvement in the art of manufacturing gas is presented.

It may be stated, in the first place, that the air in passing through the absorbent material of the generator 86 there becomes saturated with oil. It does not, therefore, receive any material addition of oil in passing from the generator through the chamber 85, notwithstanding the fact that the packing within the chamber 85 is saturated with oil. On the contrary, the scrubber and condenser, as its name indicates, performs the distinct function of cleaning the carbureted air of impurities which if present impair its practical availability.

It is a fact recognized in the art that although the oil supplied to the carbureter contains no water yet that the carbureted air obtainable from that oil contains a percentage of moisture in suspension that is very objectionable in practice. Among the impurities which it is the office of the condenser and scrubber to remove from the carbureted air that moisture is the most considerable one. I will therefore describe the process by which I deprive the carbureted air of the said moisture. It may be noted in this connection that in its mechanical aspect, as illustrated, I produce in effect two currents of oil, one flowing against the incoming current of the carbureted air and the other flowing with it a certain distance. This feature, so far as the mechanical embodiment of my invention is concerned, is important; but as the principle of the invention appears to reside in certain physical conditions and in a measure to be independent of the particular form of embodiment of my invention shown in the apparatus I propose to claim the method by which the result is accomplished, and accordingly specify the same in the following language: The air from the pipe 87 after entering the generator 86 produces, in consequence of the evaporation which takes place in the generator and within the chamber 85, in accordance with a well-known physical law, a lowering of the temperature. In point of fact, so great is the reduction of the temperature effected by the evaporation within the generator 86 and the chamber 85 that it becomes readily ascertainable to the touch without the use of a thermometer. Accordingly by the time that the carbureted air reaches the top of the chamber 85 it is cold. There it meets an incoming flow of comparatively warmer oil from the pipe 80. The discharge of the warm oil against the cold carbureted air condenses the watery vapors within the latter and precipitates them, so that by the time the carbureted air or gas reaches the pipe 98 it is, for all practical purposes, dry and clean.

What I claim is—

1. The improvement in the method of gas manufacture, which consists in discharging into a confined body of carbureted air, a continuous flow of oil at a higher temperature than the air, and thereby condensing the watery vapors held suspended in the carbureted air, substantially as set forth.

2. The improvement in the method of gas manufacture, which consists in producing a flow of carbureted air within a confining-chamber in two directions, and discharging into the same, at a point approximate to that at which the change in direction of flow of the carbureted air takes place, a supply of oil and directing a portion of the flow of oil against the air-current, and a portion along with it, substantially as set forth.

In testimony of all which I have hereunto subscribed my name.

STANLEY C. NORTH.

Witnesses:
HARRISON B. FERGUSON,
MARY L. STAPLETON.